United States Patent
Lenniger

(10) Patent No.: US 12,312,005 B2
(45) Date of Patent: May 27, 2025

(54) MOTOR VEHICLE SERIES AND MOTOR PUMP UNIT ASSEMBLY

(71) Applicant: Dr. Ing. h.c. F. Porsche Aktiengesellschaft, Stuttgart (DE)

(72) Inventor: Christoph Lenniger, Renningen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 18/390,095

(22) Filed: Dec. 20, 2023

(65) Prior Publication Data
US 2024/0278835 A1 Aug. 22, 2024

(30) Foreign Application Priority Data
Feb. 16, 2023 (DE) ...................... 10 2023 103 774.9

(51) Int. Cl.
*B60G 13/00* (2006.01)
*B60G 13/08* (2006.01)
(Continued)

(52) U.S. Cl.
CPC ............ *B62D 21/11* (2013.01); *B60G 13/003* (2013.01); *B60G 13/08* (2013.01);
(Continued)

(58) Field of Classification Search
CPC ........ B62D 21/00; B62D 21/11; B62D 21/12; B62D 21/14; B62D 21/16; B60K 17/165;
(Continued)

(56) References Cited

U.S. PATENT DOCUMENTS 7,611,152 B2 * 11/2009 van der Knaap .... B60G 17/056
280/124.16
9,174,508 B2 * 11/2015 Anderson ............ B60G 17/016
(Continued)

FOREIGN PATENT DOCUMENTS

DE 10148095 A1 * 4/2003 ........... B60G 21/055
DE 102006054994 A1 5/2008
(Continued)

OTHER PUBLICATIONS

Description Translation for DE 102014019495 from Espacenet (Year: 2014).*
(Continued)

*Primary Examiner* — Jason D Shanske
*Assistant Examiner* — Daniel M. Keck
(74) *Attorney, Agent, or Firm* — Buchanan Ingersoll & Rooney PC

(57) ABSTRACT

A motor vehicle series includes two different motor vehicle variants. The two motor vehicle variants include an identically designed chassis component fastening device, to which a stabilizer is fastened in the first motor vehicle variant and a motor-pump unit assembly with a motor-pump unit of a hydraulic damping system is fastened in the second motor vehicle variant. The motor-pump unit assembly includes a motor-pump unit for a hydraulic damping system. A holding tube is fastened to the motor-pump unit. A holding element, which is configured to be mounted on a chassis component fastening device of a motor vehicle, is fastened to the end of the holding tube facing away from the motor-pump unit.

14 Claims, 2 Drawing Sheets

(51) Int. Cl.
  *B60G 17/08*  (2006.01)
  *B60G 21/055* (2006.01)
  *B62D 21/00*  (2006.01)
  *B62D 21/11*  (2006.01)
  *B62D 21/12*  (2006.01)
  *B62D 21/14*  (2006.01)
  *B62D 21/16*  (2006.01)

(52) U.S. Cl.
  CPC ........ *B60G 21/0551* (2013.01); *B60G 21/055* (2013.01); *B60G 2202/135* (2013.01); *B60G 2204/122* (2013.01); *B60G 2204/1222* (2013.01); *B60G 2204/1224* (2013.01); *B60G 2206/01* (2013.01); *B60G 2206/201* (2013.01); *B60G 2206/427* (2013.01); *B62D 21/00* (2013.01); *B62D 21/12* (2013.01); *B62D 21/14* (2013.01); *B62D 21/16* (2013.01)

(58) Field of Classification Search
  CPC ............ B60K 21/055; B60K 2202/135; B60G 2204/122; B60G 2204/1222; B60G 2204/1224; B60G 2206/01; B60G 2206/201; B60G 2206/427
  See application file for complete search history.

(56) References Cited

U.S. PATENT DOCUMENTS

| | | | |
|---|---|---|---|
| 11,554,625 B2 * | 1/2023 | Kemnitz | .................. H02K 5/04 |
| 2015/0014955 A1 | 1/2015 | Leibl | |
| 2020/0355202 A1 * | 11/2020 | Lauterbach | .............. B60G 9/02 |
| 2024/0300313 A1 * | 9/2024 | Kalinowski | ......... B60R 16/0207 |

FOREIGN PATENT DOCUMENTS

| | | | | |
|---|---|---|---|---|
| DE | 102010012324 A1 * | 10/2010 | ............. F16F 7/104 |
| DE | 102010014185 A1 | 1/2011 | | |
| DE | 102014005603 A1 * | 10/2014 | ............ B60G 13/08 |
| DE | 102014019495 A1 | 6/2015 | | |
| DE | 102018204151 A1 * | 9/2019 | | |
| DE | 102019205549 A1 | 10/2020 | | |

OTHER PUBLICATIONS

Great Britain Combined Search and Examination Report issued Dec. 20, 2024, by the Great Britain Intellectual Property Office in corresponding Great Britain Application No. GB2401754.3. (8 pages).

\* cited by examiner

MOTOR VEHICLE SERIES AND MOTOR PUMP UNIT ASSEMBLY

CROSS-REFERENCE TO RELATED APPLICATION

This application claims priority to German Patent Application No. 10 2023 103 774.9, filed Feb. 16, 2023, the content of such application being incorporated by reference herein in its entirety.

FIELD OF THE INVENTION

The present invention relates to a motor vehicle series comprising two different motor vehicle variants. The present invention furthermore relates to a motor-pump unit assembly comprising a motor-pump unit for a hydraulic damping system.

BACKGROUND OF THE INVENTION

Vehicle manufacturers typically offer their motor vehicle models in different equipment variants, which in particular also differ in the respectively installed vehicle components. Due to the relatively high costs of active hydraulic damping systems, vehicle manufacturers generally also offer a motor vehicle variant with a conventional passive damping system in addition to a motor vehicle variant with an active hydraulic damping system.

In light of this, described herein is a relatively cost-effective production of a motor vehicle series with two different motor vehicle variants, wherein one of the two motor vehicle variants comprises an active hydraulic damping system.

SUMMARY OF THE INVENTION

The motor vehicle series according to aspects of the invention comprises at least two different motor vehicle variants of a motor vehicle model, wherein one of the two motor vehicle variants comprises an active hydraulic damping system and the other motor vehicle variant comprises a stabilizer. The active hydraulic damping system comprises hydraulically adjustable shock absorbers and a motor-pump unit, i.e., a unit consisting of an electric motor and a pumping device driven by the electric motor, for providing hydraulic energy for actuating the hydraulically adjustable shock absorbers. By purposefully adjusting the shock absorbers of the individual wheels, the function of the stabilizer can in this case be assumed so that the stabilizer can be omitted in motor vehicle variants with an active hydraulic damping system.

According to aspects of the invention, both motor vehicle variants comprise an identically designed chassis component fastening device for fastening a chassis component to a vehicle body, wherein, in the first motor vehicle variant, the stabilizer is fastened to the chassis component fastening device and, in the second motor vehicle variant, a motor-pump unit assembly with the motor-pump unit of the active hydraulic damping system is fastened to the same chassis component fastening device. In that the same chassis component fastening device is used for both motor vehicle variants, the motor vehicle series according to aspects of the invention can be produced relatively cost-effectively.

The stabilizer is typically mounted via a plurality of stabilizer bearings which are fixedly connected to the vehicle body. Since the stabilizer bearings can likewise be omitted in the second equipment variant, the chassis component fastening device in a preferred embodiment comprises screw-on points at which the stabilizer bearings mounting the stabilizer are screwed on in the first motor vehicle variant and at which the motor-pump unit assembly is screwed on in the second motor vehicle variant.

The motor-pump unit assembly according to aspects of the invention comprises a motor-pump unit for an active hydraulic damping system and a holding tube fastened to the motor-pump unit. A holding element is fastened to an end of the holding tube facing away from the motor-pump unit and is configured to be mounted on a chassis component fastening device of a motor vehicle. By correspondingly designing the holding tube, in particular a length of the holding tube, and the holding element, the motor-pump unit assembly according to aspects of the invention can be simply designed for mounting on a chassis component fastening device, which is used for fastening a stabilizer in another motor vehicle variant. This enables a relatively cost-effective production of a motor vehicle series with two different motor vehicle variants, wherein one of the two motor vehicle variants comprises an active hydraulic damping system.

Preferably, a distance between the motor-pump unit and the holding element is adaptable, for example by providing holding tubes of different lengths, so that the motor-pump unit assembly according to aspects of the invention is adaptable to various chassis component fastening devices, in particular to chassis component fastening devices having different distances between fastening elements of the chassis component fastening device. This, for example, enables the motor-pump unit assembly according to aspects of the invention to be simply adapted for use in different vehicle models and/or vehicle type series.

Typically, the motor-pump unit has a pump cover on one side. Preferably, the pump cover comprises a tube receptacle in which the holding tube is received and preferably also fastened. This enables the holding tube to be fastened to the pump cover in a relatively simple manner before the latter is fastened to the motor-pump unit.

Preferably, the holding tube is fastened to the motor-pump unit via a brush device. The brush unit makes it possible to generate particularly high static friction with the holding tube and thus a reliable anti-rotation lock of the holding tube. Preferably, the brush device is arranged in the tube receptacle of the pump cover.

In a preferred embodiment, the holding element fastened to the holding tube is configured to be screwed onto the chassis component fastening device, typically at corresponding screw-on points of a fastening element of the chassis component fastening device, parallel to a holding tube longitudinal direction of the holding tube.

Preferably, a further holding element is arranged on a side of the motor-pump unit facing away from the holding element and is configured to be mounted on the chassis component fastening device, in particular on a fastening element of the chassis component fastening device. Preferably, the further holding element is directly fastened to the motor-pump unit, preferably to a housing bottom of the motor-pump unit.

Preferably, the further holding element is configured to be screwed onto the chassis component fastening device, typically at corresponding screw-on points of a fastening element of the chassis component fastening device, parallel to the holding tube longitudinal direction.

BRIEF DESCRIPTION OF THE DRAWINGS

An exemplary embodiment of the present invention is described below with reference to the accompanying figures.

DETAILED DESCRIPTION OF THE INVENTION

Figure 1:
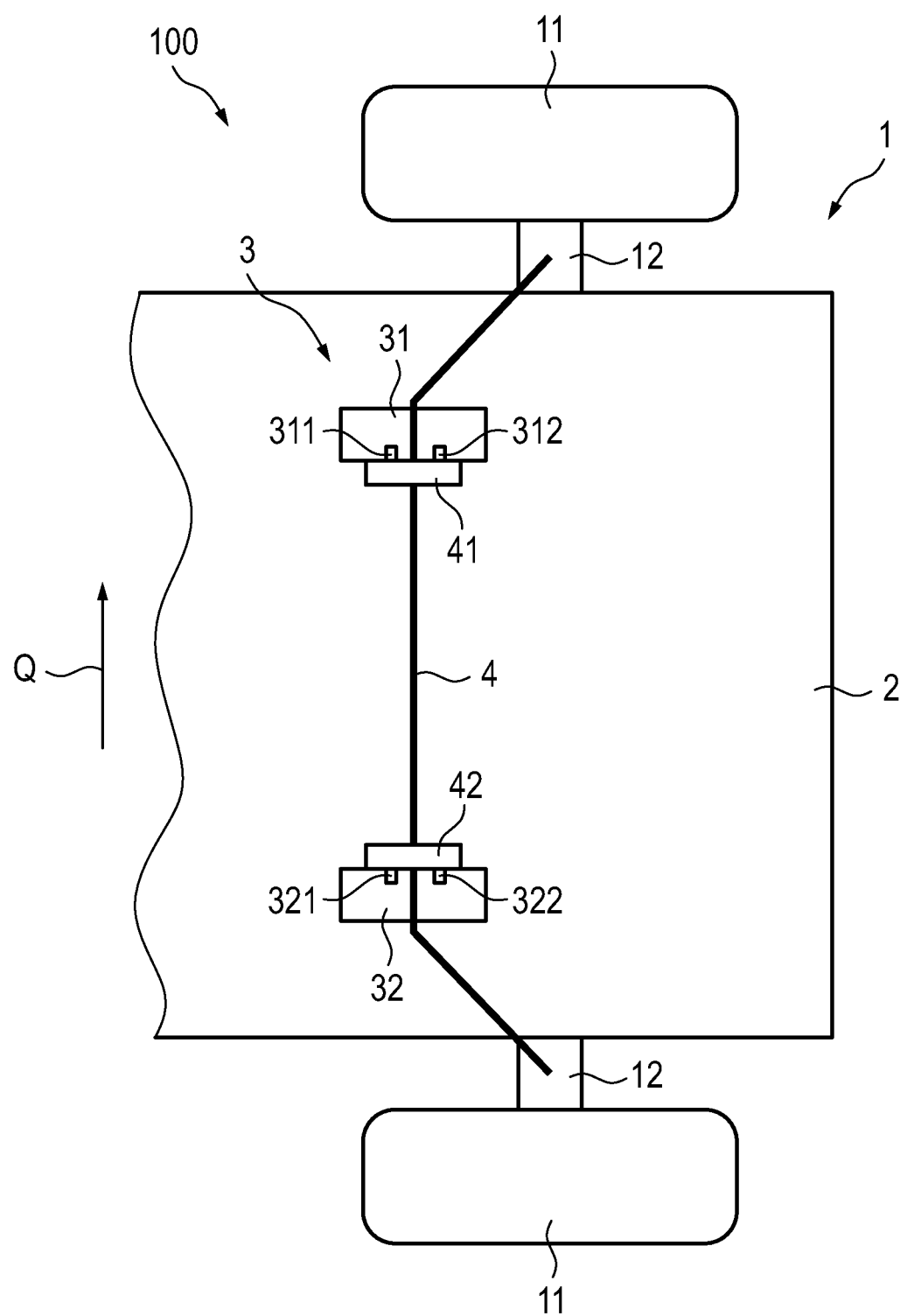
FIG. 1 schematically shows a rear axle of a first motor vehicle variant of a motor vehicle series according to aspects of the invention, wherein a stabilizer is fastened to a chassis component fastening device, and FIG. 2 schematically shows a rear axle of a second motor vehicle variant of the motor vehicle series according to aspects of the invention, wherein a motor-pump unit assembly according to aspects of the invention is fastened to the chassis component fastening device.

FIG. 1 shows a rear axle 1 of a first motor vehicle variant 100 of a motor vehicle series according to aspects of the invention. The rear axle 1 comprises two wheels 11, which are each connected to a vehicle body 2 of the motor vehicle variant 100 via a wheel suspension 12, which is not specified in more detail.

A chassis component fastening device 3 is arranged on the rear axle 1 and comprises two fastening elements 31, 32 fixedly connected to the vehicle body 2. The two fastening elements 31, 32 are arranged spaced apart from one another relative to a transverse vehicle direction Q and respectively have two screw-on points 311, 312, 321, 322.

A stabilizer 4 is fastened to the chassis component fastening device 3, wherein a first stabilizer bearing 41, which mounts the stabilizer 4, is screwed on at the two screw-on points 311, 312 of the first fastening element 31, and a second stabilizer bearing 42, which mounts the stabilizer 4, is screwed on at the second screw-on points 321, 322 of the second fastening element 32, in each case by means of screws extending substantially parallel to the transverse vehicle direction Q.

Figure 2:
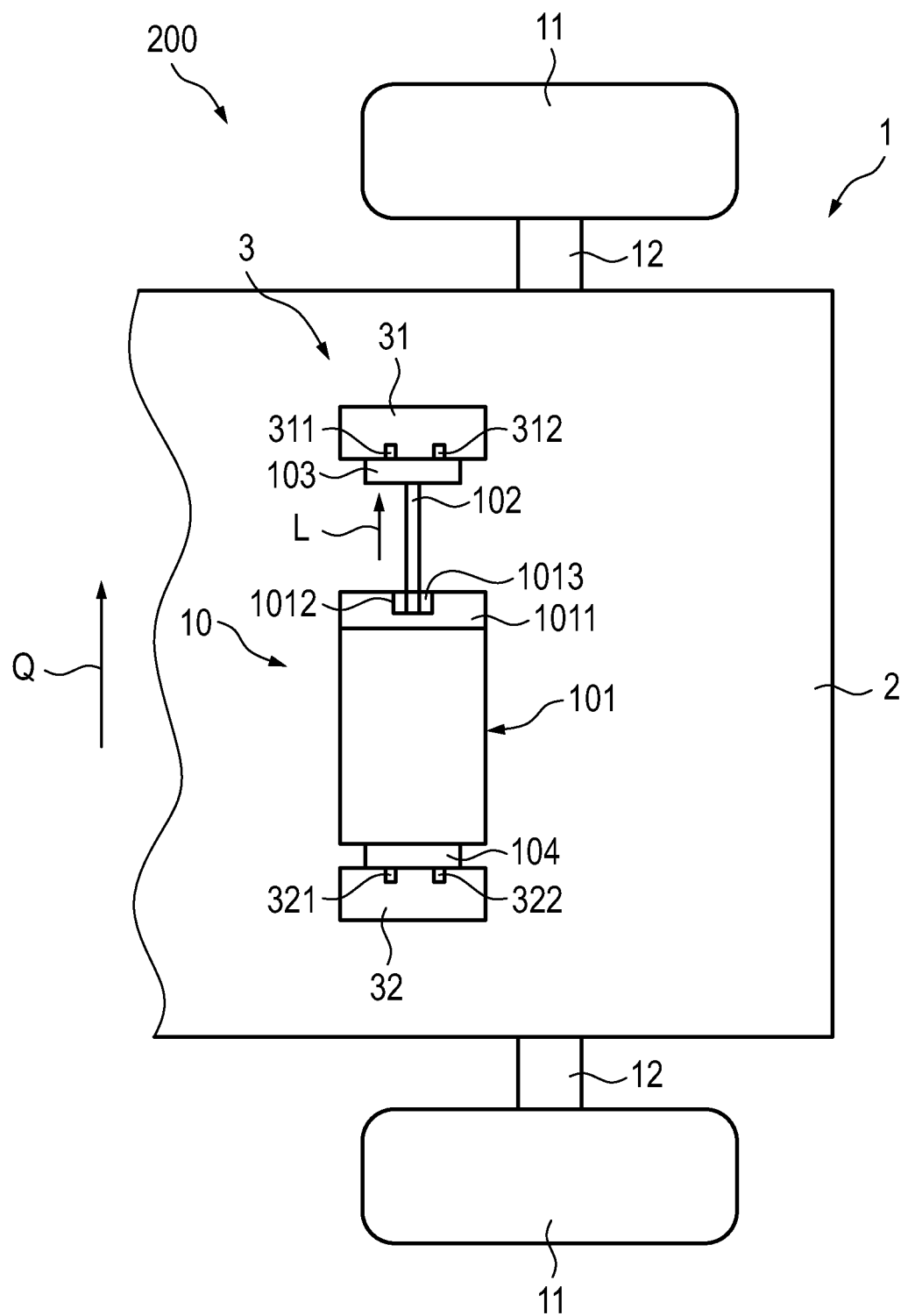

FIG. 2 shows the rear axle 1 of a second motor vehicle variant 200 of the motor vehicle series according to aspects of the invention. The second motor vehicle variant 200 comprises an active hydraulic damping system (not shown here) and therefore differs from the first motor vehicle variant 100 in particular in the configuration of the wheel suspensions 12. However, the second motor vehicle variant 200 comprises the same, i.e., an identically designed, chassis component fastening device 3 as the first motor vehicle variant 100, to which chassis component fastening device a motor-pump unit assembly 10 according to aspects of the invention is, however, fastened in the second motor vehicle variant 200.

The motor-pump unit assembly 10 comprises a motor-pump unit 101 of the active hydraulic damping system and a holding tube 102. The holding tube 102 extends parallel to the transverse vehicle direction Q and enters a tube receptacle 1012 formed on a pump cover 1011 of the motor-pump unit 101. The holding tube 102 is fastened to the motor-pump unit 101 via a brush device 1013 arranged in the tube receptacle 1012.

A first holding element 103 is arranged at an end of the holding tube 102 facing away from the motor-pump unit 101 and is fixedly connected to the holding tube 102. The first holding element 103 is screwed on at the screw-on points 311, 312 of the first fastening element 31 of the chassis component fastening device 3 by means of screws extending substantially parallel to a holding tube longitudinal direction L of the holding tube 102, i.e., parallel to the transverse vehicle direction Q.

A second holding element 104 is arranged on a side of the motor-pump unit 101 facing away from the first holding element 103 and is fixedly connected to the motor-pump unit 101. The second holding element 104 is screwed on at the screw-on points 321, 322 of the second fastening element 32 of the chassis component fastening device 3 by means of screws extending substantially parallel to the holding tube longitudinal direction L.

According to aspects of the invention, in the motor-pump unit assembly 10, a distance between the motor-pump unit 101 and the first holding element 103 is adaptable, for example by providing holding tubes 102 of different lengths.

What is claimed is:

1. A motor-pump unit assembly comprising:
   a motor-pump unit for an active hydraulic damping system,
   a holding tube fastened to the motor-pump unit,
   a first holding element, which is disposed on one side of the motor-pump-unit, the first holding element being configured to be mounted on a first chassis component fastening device of a motor vehicle, the first holding element being directly fastened to an end of said holding tube facing away from the motor-pump unit, and
   a second holding element disposed on an opposite side of the motor-pump-unit, the second holding element being fixedly connected to the motor-pump-unit and configured to be mounted on a second chassis component fastening device of the motor vehicle,
   wherein the holding tube spans a gap disposed between the first holding element and said one side of the motor-pump-unit,
   wherein a distance between the motor-pump unit and the first holding element is adjustable.

2. The motor-pump unit assembly according to claim 1, wherein the holding tube is fastened to the motor-pump unit.

3. The motor-pump unit assembly according to claim 1, wherein the first and second holding elements are configured to be screwed onto the first and second chassis component fastening devices, respectively, parallel to a holding tube longitudinal direction of the holding tube.

4. A motor vehicle comprising the motor-pump unit assembly according to claim 1.

5. The motor-pump unit assembly according to claim 1, wherein the holding tube is non-rotatably fastened to the motor-pump unit.

6. The motor-pump unit assembly according to claim 1, wherein the first and second chassis component fastening devices are fixed to a body of the vehicle.

7. The motor-pump unit assembly according to claim 1, wherein the second holding element is sandwiched between the motor-pump-unit and the second chassis component fastening device.

8. The motor-pump unit assembly according to claim 1, wherein the holding tube extends parallel to a transverse direction of the vehicle and perpendicular to a longitudinal direction of travel of the vehicle.

9. The motor-pump unit assembly according to claim 1, wherein the first holding element is removably connected to the first chassis component fastening device by fasteners, and wherein the second holding element is removably connected to the second chassis component fastening device by fasteners.

10. The motor-pump unit assembly according to claim 1, wherein the first holding element is directly mounted on the first chassis component fastening device of a motor vehicle.

11. The motor-pump unit assembly according to claim 10, wherein the second holding element is directly connected to the motor-pump-unit.

12. The motor-pump unit assembly according to claim 11, wherein the second holding element is directly mounted on the second chassis component fastening device of the motor vehicle.

13. A motor-pump unit assembly comprising:
- a motor-pump unit for an active hydraulic damping system,
- a holding tube fastened to the motor-pump unit,
- a first holding element, which is disposed on one side of the motor-pump-unit, the first holding element being configured to be mounted on a first chassis component fastening device of a motor vehicle, the first holding element being directly fastened to an end of said holding tube facing away from the motor-pump unit, and
- a second holding element disposed on an opposite side of the motor-pump-unit, the second holding element being fixedly connected to the motor-pump-unit and configured to be mounted on a second chassis component fastening device of the motor vehicle,
- wherein the holding tube spans a gap disposed between the first holding element and said one side of the motor-pump-unit,
- wherein a pump cover of the motor-pump unit comprises a tube receptacle in which the holding tube is received.

14. A motor-pump unit assembly comprising:
- a motor-pump unit for an active hydraulic damping system,
- a holding tube fastened to the motor-pump unit,
- a first holding element, which is disposed on one side of the motor-pump-unit, the first holding element being configured to be mounted on a first chassis component fastening device of a motor vehicle, the first holding element being directly fastened to an end of said holding tube facing away from the motor-pump unit, and
- a second holding element disposed on an opposite side of the motor-pump-unit, the second holding element being fixedly connected to the motor-pump-unit and configured to be mounted on a second chassis component fastening device of the motor vehicle,
- wherein the holding tube spans a gap disposed between the first holding element and said one side of the motor-pump-unit,
- wherein a pump cover of the motor-pump unit comprises a tube receptacle in which the holding tube is non-rotatably mounted.

\* \* \* \* \*